(12) United States Patent
Yamauchi

(10) Patent No.: US 6,543,334 B2
(45) Date of Patent: Apr. 8, 2003

(54) CYLINDER BLOCK AND METHOD OF MAKING THE SAME

(75) Inventor: Toshio Yamauchi, Hamamatsu (JP)

(73) Assignee: Suzuki Motor Corporation, Hamamatsu (JP)

(*) Notice: Subject to any disclaimer, the term of this patent is extended or adjusted under 35 U.S.C. 154(b) by 0 days.

(21) Appl. No.: 09/929,217

(22) Filed: Aug. 14, 2001

(65) Prior Publication Data
US 2002/0020287 A1 Feb. 21, 2002

(30) Foreign Application Priority Data
Aug. 18, 2000 (JP) ........................................ 2000-248083

(51) Int. Cl.⁷ ................................................ F16C 9/02
(52) U.S. Cl. .................................... 92/140; 384/294
(58) Field of Search ............................ 92/140; 384/294

(56) References Cited

U.S. PATENT DOCUMENTS 4,693,216 A 9/1987 Ampferer et al.
5,551,782 A * 9/1996 Arnhold et al. ............. 384/294
5,609,422 A * 3/1997 Mueller et al. .............. 384/294

* cited by examiner

Primary Examiner—Edward K. Look
Assistant Examiner—Thomas E. Lazo
(74) Attorney, Agent, or Firm—Alston & Bird LLP

(57) ABSTRACT

The present invention provides a cylinder block which can reduce the vibrations and noises produced from the engine at high temperatures and has a light weight, as well as a method of making such a cylinder block. Specifically, the cylinder block of the present invention comprises a main body (5, 21) of the cylinder block, a bearing (11, 17) attached to the underside of the main body (5, 21), and a crankshaft supported rotatably in a bearing section (13, 25) formed by the underside of the main body (5, 21) and the bearing (11, 17). In this cylinder block, an aluminum alloy layer (33) is formed in the sliding portion of the bearing section (13, 25), the region adjacent to the aluminum alloy layer (33) consists of a composite material (35), and the coefficient of thermal expansion of the composite material (35) is lower than that of the aluminum alloy layer (33) formed in the sliding portion.

3 Claims, 7 Drawing Sheets

CYLINDER BLOCK AND METHOD OF MAKING THE SAME

BACKGROUND OF THE INVENTION

1. Field of the Invention

This invention relates to cylinder blocks for use in engines and a method of making the same. More particularly, it relates to crankshaft bearings used in cylinder blocks, and a method of making the same.

2. Description of Related Art

Conventionally, as illustrated in FIG. 13, a cylinder block 101 includes a main body 103 constituting the upper part of the cylinder block, and bearing caps 105 disposed at the bottom of main body 103. These main body 103 and bearing caps 105 are both made of an aluminum alloy. These main body 103 and bearing caps 105 form a bearing section 107, in which a crankshaft (not shown) is rotatably supported. For reasons of rigidity, rotational balance and the like, this crankshaft is formed of an iron-based alloy (i.e., steel or cast iron). While the vehicle is running, the temperature of cylinder block 101 rises to about 100° C. or above.

Since the aluminum alloy has a coefficient of linear expansion of about $22 \times 10^{-6}$/K and the iron-based member has a coefficient of linear expansion of about $12 \times 10^{-6}$/K, the bearing bore diameter of the bearing section expands to a greater extent than the outer diameter of the crankshaft when the vehicle is running to make the engine hot. Consequently, the clearance between the crankshaft and the bearing bore 109 is increased during running of the vehicle, so that the rotation of the crankshaft produces considerable vibrations and noises.

In order to prevent the production of such vibrations and noises, there has been proposed a method in which the bearing section 107 and the crankshaft are made of materials having almost equal coefficients of thermal expansion. For example, Japanese Patent Publication (JP-B) No. 6-86882 discloses a method in which the bearing section is wrapped with a cast iron-based material.

However, as contrasted with the specific gravity (2.7 g/cm³) of aluminum, the specific gravity of steel is 7.8 g/cm³ and the specific gravity of cast iron is 6.9 g/cm³. Thus, since the specific gravities of iron-based materials are about 2.5 to 3 times higher than that of an aluminum alloy, the wrapping of the bearing section with a cast iron-based material has a problem in that the weight of the cylinder block itself is unduly increased.

Moreover, the wrapping material is an iron-based material which is dissimilar to the aluminum alloy constituting the parent material, its adhesion to the aluminum alloy member is not always satisfactory.

Furthermore, the bearing section must be subjected to a final finishing step for forming.a bearing bore by machining. However, the iron-based material used as the wrapping material is so hard that its machinability is not satisfactorily good.

SUMMARY OF THE INVENTION

It is an object of the present invention to solve the above-described problems by providing a cylinder block which can reduce the vibrations and noises produced from the engine at high temperatures and has a light weight, as well as a method of making such a cylinder block.

According to the present invention, there is provided a cylinder block comprising a main body of the cylinder block, a bearing attached to the underside of the main body, and a crankshaft supported rotatably in a bearing section formed by the underside of the main body and the bearing, wherein an aluminum alloy layer is formed in the sliding portion of the bearing section, the region adjacent to the aluminum alloy layer consists of a composite material, and the coefficient of thermal expansion of the composite material is lower than that of the aluminum alloy layer formed in the sliding portion.

The bearing section of the aforesaid cylinder block is provided with a bearing bore for a crankshaft, and the inner surface of this bearing bore serves as a sliding surface on which a crankshaft rotates. The sliding portion including the sliding surface consists of an aluminum alloy layer formed, for example, of ADC12 (aluminum diecasting material), and the region adjacent to the sliding portion consists of a composite material.

When the engine becomes hot, for example, during running of the vehicle, the sliding portion tries to expand outwards by the action of heat. However, since the adjacent region has a lower coefficient of thermal expansion than the sliding portion, the sliding portion is forced back inwards by the composite material constituting the adjacent region, so that the expansion of the bearing bore is eventually controlled. Consequently, the clearance between the crankshaft and the bearing bore is not appreciably increased, thus permitting the vibrations and noises produced from the engine during running of the vehicle to be kept on a low level. Moreover, since the bearing section is composed of an aluminum alloy layer and a composite material using an aluminum alloy, the weight of the cylinder block can be reduced and this, in turn, contributes to a reduction in the weight of the whole vehicle. Furthermore, since the composite material is composed partly of an aluminum alloy, it can be simply prepared at low cost. On the other hand, the sliding portion consists of an aluminum alloy layer and hence exhibits good machinability during final finishing by machining of the inner surface of the bearing bore.

As the aforesaid composite material, there may preferably be used a composite material formed by impregnating a compression-molded preform with a molten aluminum alloy. The aforesaid preform is preferably prepared by compression molding of a particulate material, a fibrous material, or a mixture of a particulate material and a fibrous material. As the aforesaid particulate or fibrous material, there may preferably be used any of various ceramic materials such as oxides, carbides and nitrides.

Useful oxides include, for example, silica ($SiO_2$), alumina ($Al_2O_3$), mullite ($Al_2O_3$—$SiO_2$), spinel (MgO—$Al_2O_3$), magnesia (MgO) and calcia (CaO). Preferred examples of carbides include silicon carbide (SiC), and preferred examples of nitrides include silicon nitride ($Si_3N_4$), aluminum nitride (AlN) and boron nitride (BN).

Owing to the use of particular and/or fibrous materials, the aforesaid composite material brings about an improvement in the rigidity and toughness of the bearing section. Moreover, an aluminum composite material having high rigidity can be obtained by using a particular or fibrous material having a high modulus of longitudinal elasticity (Young's modulus), for example, a modulus of longitudinal elasticity higher than the modulus of longitudinal elasticity of steel (i.e., $2.1 \times 10^{11}$ N/m²)

The method of making a cylinder block in accordance with the present invention comprises the step of preparing a preform by adding a silica type additive to at least one of a particulate material and a fibrous material, and compression-molding the resulting blend; and the step of casting a molten aluminum alloy into said preform and thereby fabricating a bearing section in which an aluminum alloy layer is formed in its sliding portion for a crankshaft and the region adjacent to the sliding portion consists of a composite material.

Preferably, the particulate material has an average particle diameter of 10 to 500 µm, the fibrous material has an average fiber diameter of 1 to 10 µm, and the preform has a volume fraction of 15 to 40%. The particulate or fibrous material may comprise at least one material selected from oxides such as silica, alumina, mullite, spinel, magnesia and calcia; carbides such as silicon carbide; and nitrides such as silicon nitride, aluminum nitride and boron nitride. The aforesaid volume fraction is defined as the proportion of the volume of the particulate and fibrous materials to the total volume of the compression-molded preform. This can be determined by calculating the bulk specific gravity of the preform from its volume and weight, dividing this specific gravity by the true specific gravity-of the particulate and fibrous materials added, and expressing the quotient as a percentage.

According to the above-described method, the surfaces of the particular material and/or the fibrous material are modified by the addition of the silica type additive, so that the pressure at which the molten aluminum alloy begins to penetrate into the preform is 1 MPa or less. In the fabrication of the composite material, therefore, the preform can surely be impregnated with the molten aluminum alloy in a short time. Accordingly, the length of time required to make a cylinder block can be reduced. Moreover, the composite material constituting the bearing section can be fully impregnated with the aluminum alloy.

Since the cylinder block of the present invention is made by using an aluminum alloy, it has a light weight and hence contributes to a reduction in the weight of the whole engine. Moreover, even if the cylinder block becomes hot, the bearing bore diameter is not appreciably enlarged and, therefore, the clearance between the crankshaft and the bearing bore is not increased. Consequently, even during running of the vehicle, the vibrations and noises produced from the engine can be kept on a low level.

DETAILED DESCRIPTION OF THE PREFERRED EMBODIMENTS

Cylinder blocks in accordance with several embodiments of the present invention and a method of making the same will be specifically described hereinbelow with reference to the accompanying drawings.

Construction of Cylinder Blocks

Figure 1:
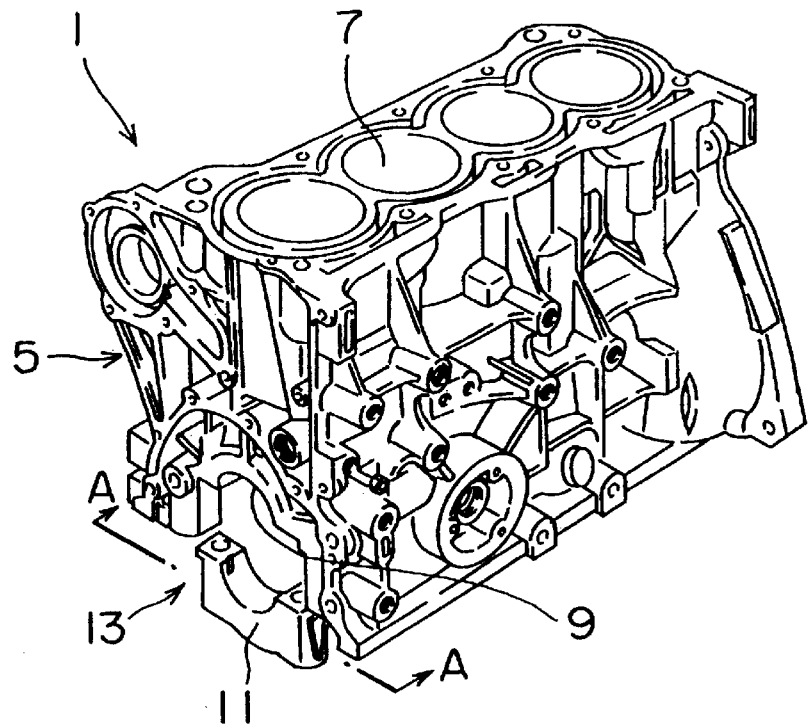
FIG. 1 is a perspective view of a bearing cap type cylinder block in accordance with the present invention.
Figure 2:
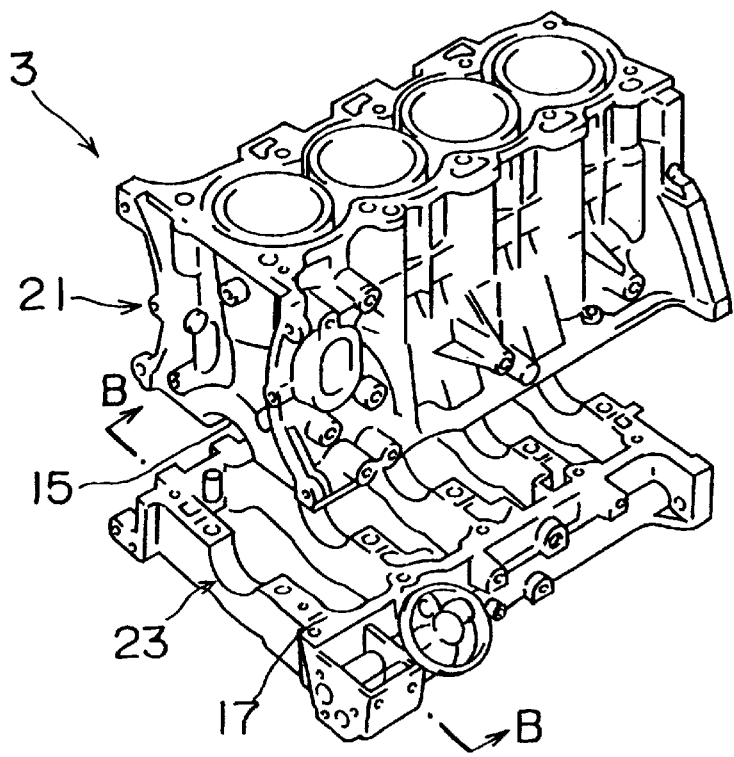
FIG. 2 is a perspective view of a lower crank case type cylinder block in accordance with the present invention.

As illustrated in FIGS. 1 and 2, the cylinder blocks embodying the present invention are broadly divided into a crank-bearing cap type 1 and a lower crank case type 2, according to their construction.

In the crank-bearing cap type cylinder block 1 illustrated in FIG. 1, its upper part comprises a main body 5 of the cylinder block which is made of an aluminum alloy. This main body 5 of the cylinder block has a plurality of vertically extending cylinder bores 7 formed therewithin, and cylinders (not shown) move up and down in these cylinder bores 7. Semicircular cutouts 9 are formed on the underside of cylinder block 1, and bearing caps 11 constituting a bearing are attached thereto from below. These cutouts 9 and bearing caps 11 constitute a bearing section 13, in which a crankshaft (not shown) rotates.

Also in the cylinder block 3 illustrated in FIG. 2, its upper part comprises a main body 21 of the cylinder block, and semicircular cutouts 15 are formed on the underside of main body 21 of the cylinder block. To this main body 21 of the cylinder block, a lower crank case 17 is attached from below. These cutouts 15 and lower crank case 17 constitute a bearing section 23.

Structure of Bearing Section

Figure 3:
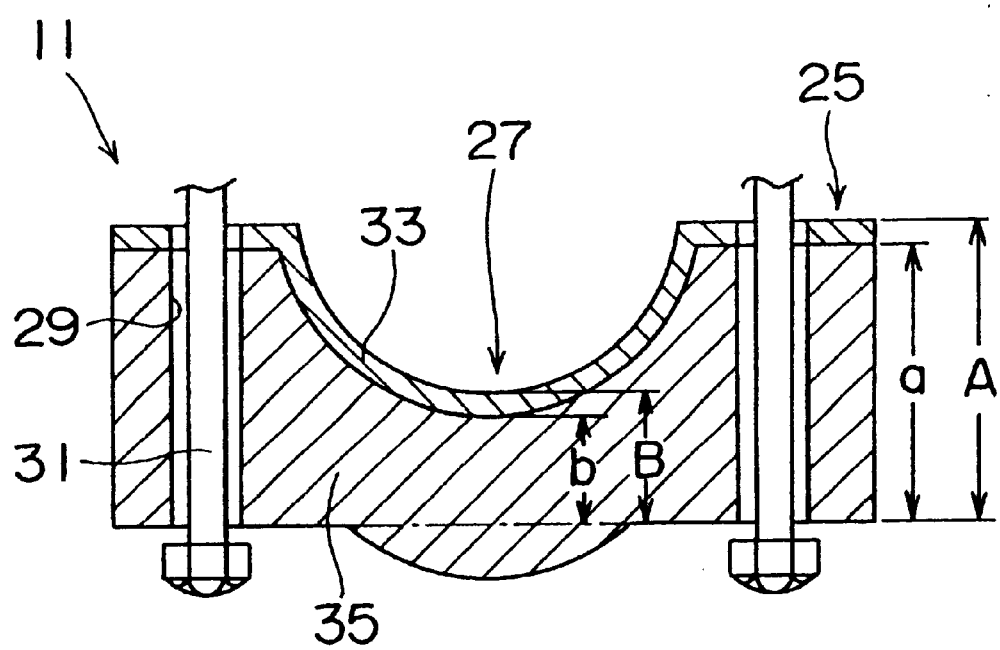
FIG. 3 is a cross-sectional view taken on line A—A in FIG. 1.
Figure 4:
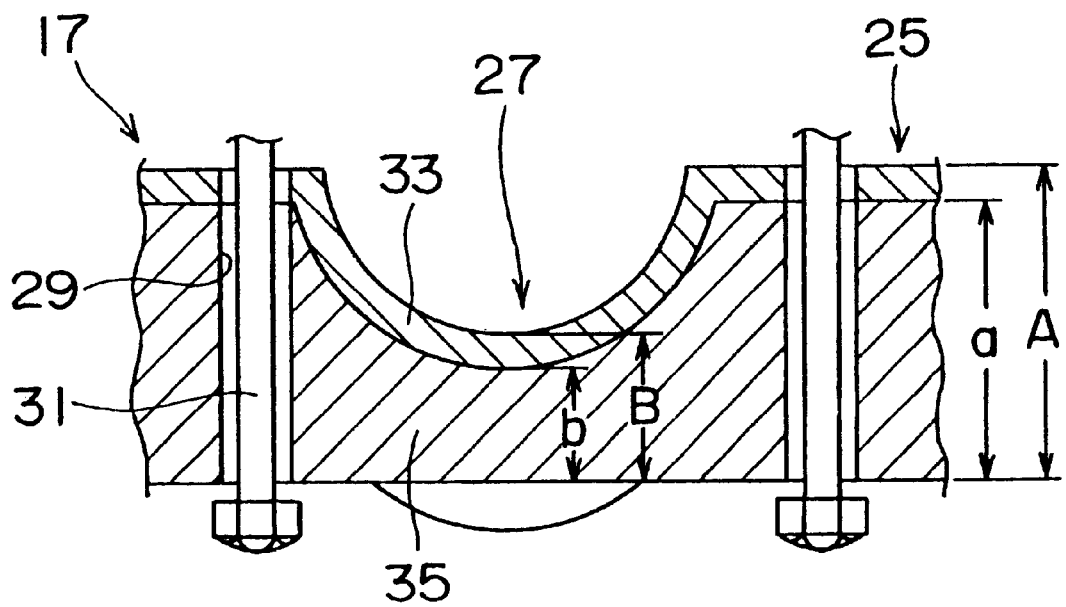
FIG. 4 is a cross-sectional view taken on line B—B in FIG. 2.

In the bearing cap 11 of FIG. 1 or the bearing part 23 of lower crank case 17 of FIG. 2, both lateral ends 25 of its upper surface are flat and the central part thereof is semi-circularly depressed to form a recess 27, as illustrated in the cross-sectional view of FIG. 3 or 4. Each lateral end 25 has a bolt hole 29 extending vertically therethrough, and a long bolt 31 is inserted into this bolt hole 29. Thus, bearing cap 11 is attached to the main body 5 or 21 of the cylinder block from below.

In FIGS. 3 and 4, the upper side of bearing cap 11 corresponds to the sliding surface on which a crankshaft rotates. On this upper sides, aluminum alloy layer 33 comprising ADC12 is formed. The side underneath aluminum alloy layer 33 corresponds to the bolt bearing surface. On this side corresponding to the bolt bearing surface, a composite material 35 is disposed. When the thickness (or height) of both lateral ends 25 of bearing cap 11 is denoted by A and the thickness (or height) of composite material 35 at both lateral ends 25 is denoted by a, the thickness (or height) of aluminum alloy layer 33 at both lateral ends 25 is (A−a). When the thickness of bearing cap 11 at the lowermost point of its central part is denoted by B and the thickness of the composite material at that point is denoted by b, the thickness of aluminum alloy layer 33 in the sliding surface is (B−b). The thicknesses a and b are within the respective ranges defined by $A/2 \leq a < A$ and $B/2 \leq b < B$.

If a=A and b=B, bearing cap 11 constituting a bearing will lack aluminum alloy layer 33 and consist entirely of composite material 35. If so, the bearing bore surface to be machined for purposes of final finishing consists of the composite material, resulting in poor machinability.

Fabrication of Bearing Section

Figure 5:
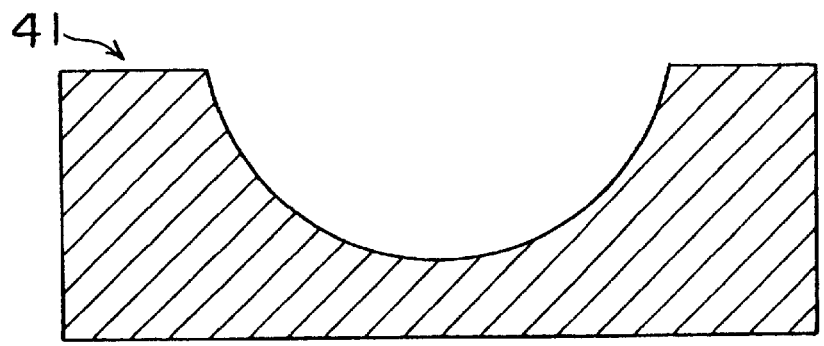
FIG. 5 is a cross-sectional view of a preform constituting a bearing in accordance with the present invention.

First of all, as illustrated in FIG. 5, a preform 41 is prepared by adding a silicon oxide type additive to a particulate material, a fibrous material, or a mixture of a particulate material and a fibrous material, and then compression-molding the resulting blend. This additive modifies the surfaces of the particular material and/or the fibrous material, and thereby improves their wettability by an aluminum alloy. Accordingly, the addition of the additive facilitates the penetration of a molten aluminum alloy into preform 41.

Figure 6:
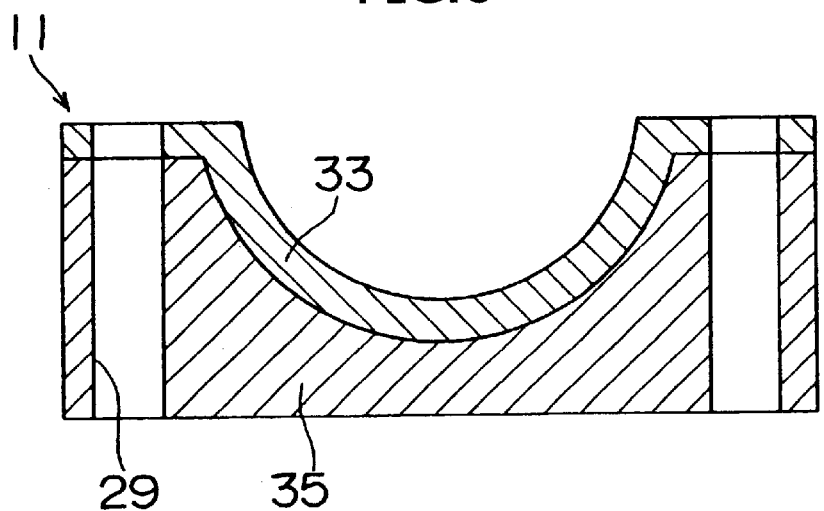
FIG. 6 is a cross-sectional view of a bearing in accordance with the present invention.

Then, preform 41 is placed in a mold (not shown), into which a molten aluminum alloy (ADC12) is poured. After the mold is closed, the molten aluminum alloy is diecast by applying a predetermined pressure thereto. Thus, as illustrated in FIG. 6, the molten aluminum alloy penetrates into interstices within preform 41 to form a composite material 35 and, moreover, an aluminum alloy layer 33 is formed on the upper surface of composite material 35.

As a final finishing step, the upper surface is machined to form a sliding surface, and bolt holes 29 are drilled through both lateral ends to complete a bearing cap 11 for use in a bearing.

Preform

Preform 41 should preferably have a coefficient of linear expansion lower than that of steel, and a high modulus of longitudinal elasticity (Young's modulus), for example, a modulus of longitudinal elasticity higher than that of steel. The coefficient of linear expansion of steel is $12 \times 10^{-6}$/K and the modulus of longitudinal elasticity (Young's modulus) of steel is $2.1 \times 10^{11}$ N/m². Accordingly, the particulate and fibrous materials used for the aforesaid preform 41 should have a coefficient of linear expansion less than $12 \times 10^{-6}$/K and a modulus of longitudinal elasticity greater than $2.1 \times 10^{11}$ N/m². Thus, the composite material has a lower coefficient of thermal expansion (i.e., a lower coefficient of linear expansion and a lower coefficient of volume expansion) than the aluminum alloy, and higher rigidity than the aluminum alloy.

As the particulate or fibrous material constituting preform 41, there may preferably be used.oxides such as silica ($SiO_2$), alumina ($Al_2O_3$), mullite ($Al_2O_3$—$SiO_2$) and spinel (MgO—$Al_2O_3$); carbides such as silicon carbide (SiC); and nitrides such as silicon nitride ($Si_3N_4$). Moreover, there may also be used any mixture of the above-described particulate and fibrous materials. In this case, it is not required that the particulate material and the fibrous material be of the same type.

Penetration of Molten Aluminum Alloy

The penetrability of the molten aluminum alloy into preform 41 depends upon the penetration starting pressure P defined by the following equation:

$$P = -6 \cdot \lambda \cdot v \cdot \cos\theta \cdot V_P / [(1 - V_P) \cdot d_P]$$

wherein $\lambda$ is the shape-factor of particles, $v$ is the surface tension of a fluid, $\theta$ is an angle of contact, $V_P$ is the volume fraction of the particles, and $d_P$ is the diameter of the particles. For example, when $\lambda=1$, $v=0.893$ Pam (pure aluminum), $\theta=160$ (SiC), $V_P=0.35$, and $d_P=3$ $\mu$m, $P=0.90$ MPa.

According to the above equation defining the penetration starting pressure P, the-molten aluminum alloy more easily penetrates into preform 41 as the particle diameter of the particulate material constituting preform 41 is increased and the volume fraction thereof is decreased. For example, when it is assumed that preform 41 is composed of particulate and fibrous materials having an average diameter of not less than 3 $\mu$m and that the volume fraction of preform 41 is 35% or less, the pressure at which the molten aluminum alloy begins to penetrate into preform 41 is 1 MPa or less.

On the other hand, the particulate and/or fibrous materials constituting preform 41 may be subjected to a surface treatment by adding thereto a silica type additive having good surface wettability and reactivity. Thus, the penetration of the molten aluminum alloy into preform 41 can be facilitated.

Stressed State of Bearing Section at High Temperatures

During running of the vehicle, cylinder blocks 1 and 3 become hot. As a result, stresses as shown in FIG. 7 are produced in bearing cap 11.

Figure 7:
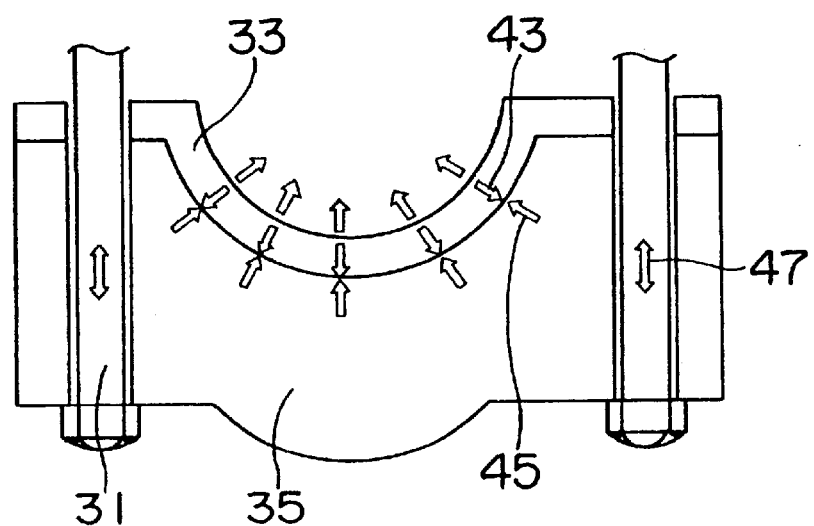
FIG. 7 is a schematic view showing stresses applied to the bearing at high temperatures.

First of all, aluminum alloy layer 33 formed on the upper surface of bearing cap 11 is thermally expanded to produce stresses 43 which cause aluminum alloy layer 33 to expand outwards, as shown by arrows in FIG. 7. On the other hand, since composite material 35 has a lower coefficient of linear expansion than aluminum alloy layer 33 and higher rigidity than aluminum alloy layer 33, it produces stresses 45 which cause the expanding aluminum alloy layer 33 to be forced back inwards. As a result, aluminum alloy layer 33 contracts toward the inside of bearing section 13 by the difference in coefficient of thermal expansion between aluminum alloy layer 33 and composite material 35. Moreover, vertically acting stresses 47 are produced in bolts 31, as shown by arrows.

It is to be understood that the present invention is not limited to the above-described embodiments, but various changes and modifications may be made therein on the basis of the technical concept of the present invention.

For example, the present invention may also be applied to any combination of structural members such as a transmission shaft and a transmission case, a cam shaft and a cylinder head, or a cam cap, provided that the shaft is formed of an iron-based material and the bearing is formed of an aluminum alloy.

Figure 8:
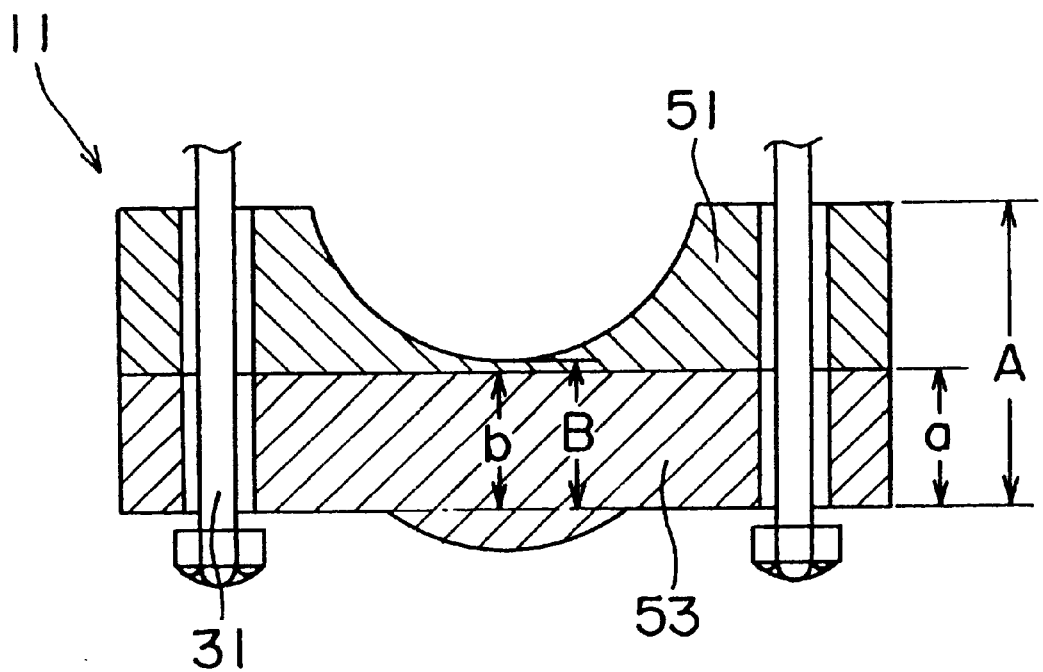
FIG. 8 is a cross-sectional view taken on line A—A in FIG. 1, illustrating a bearing in accordance with a modified embodiment of the present invention.
Figure 9:
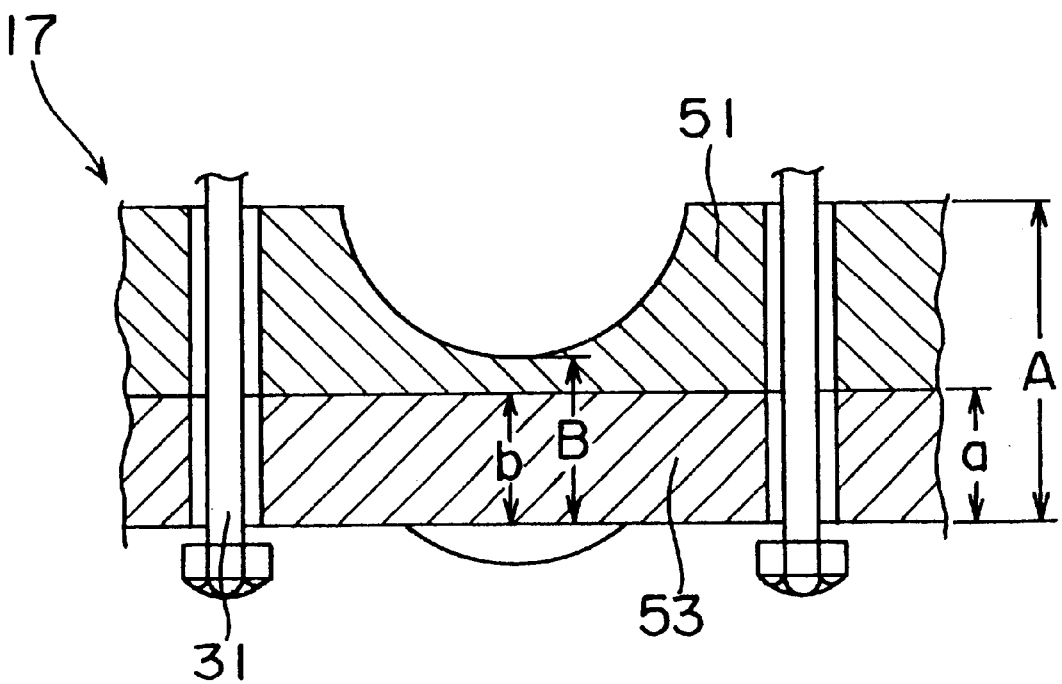
FIG. 9 is a cross-sectional view taken on line B—B in FIG. 2, illustrating a bearing in accordance with a modified embodiment of the present invention.

Moreover, in the above-described embodiments, aluminum alloy layer 33 having an almost constant thickness is formed in conformity to the upper surface of composite material 35. However, as illustrated in FIGS. 8 and 9, beating cap 11 or lower crank case 17 may be almost equally divided into upper and lower parts. Then, the upper part corresponding to the sliding surface consists of an aluminum alloy member 51 formed of ADC12, while the lower part corresponding to the bolt bearing surface consists of a composite material member 53. Also in this case, the relationships among the dimensions a, b, A and B are represented by $A/2 \leq a < A$ and $B/2 \leq b < B$.

EXAMPLES

The cylinder block of the present invention is more fully explained with reference to the following examples. In the Example of the Invention, a cylinder block was made by providing it with a bearing in which an aluminum alloy layer 33 was formed on the side of the sliding surface and the part other than the aluminum alloy layer 33 consisted of a composite material 35. In Comparative Example 1, a cylinder block was made by providing it with a bearing which was formed entirely of an aluminum alloy without using a composite material 35. In Comparative Example 2, a cylinder block was made by providing it with a bearing which was formed entirely of a composite material 35 without forming an aluminum alloy layer 33.

Example of the Invention

Preparation of a Preform

Figure 10:
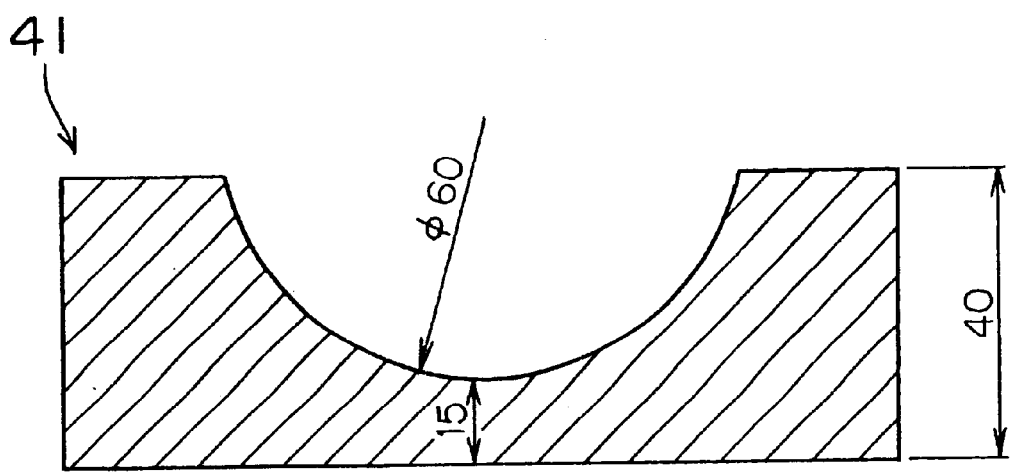
FIG. 10 is a cross-sectional view of a preform used in the Example of the Invention.

First of all, SiC particles having a particle diameter of 5 $\mu$m and $Al_2O_3$ fibers having a cross-sectional diameter of 3 $\mu$m were blended at a ratio of 8:2. Then, 5 wt. % of silica ($SiO_2$) sol was added to the blend so as to modify the surfaces of the SiC particles and $Al_2O_3$ fibers. Thereafter, the blend was compression-molded to shape a preform 41 having a volume fraction of 25%, as illustrated in FIG. 10. As can be seen from FIG. 10, the shape and dimensions of this preform 41 were such that its height at both lateral ends was 40 mm, its height at the middle point was 15 mm, and the diameter of the bearing bore was 60 mm.

The aforesaid SiC particles had a coefficient of linear expansion of $4.2 \times 10^{-6}$/K, and the aforesaid $Al_2O_3$ fibers had a coefficient of linear expansion of $7.0 \times 10^{-6}$/K. The shaped preform had a coefficient of linear expansion of $4.8 \times 10^{-6}$/K, which was satisfactorily lower than the coefficient of linear expansion ($12 \times 10^{-6}$/K) of iron.

Casting of a Molten Aluminum Alloy (Formation of a Composite Material)

Figure 11:
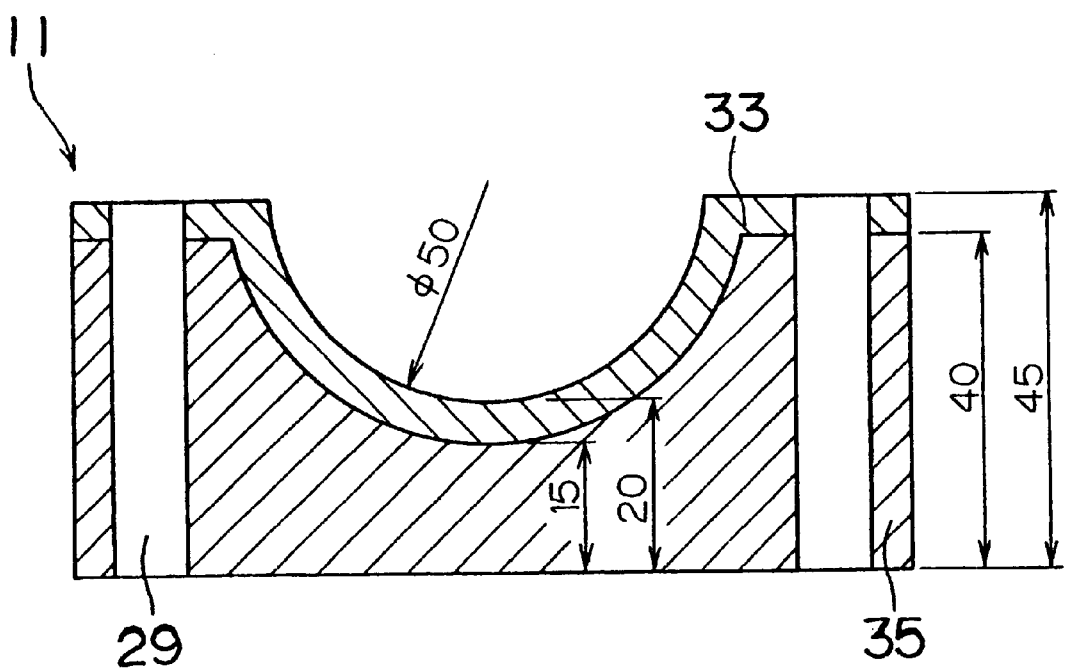
FIG. 11 is a cross-sectional view of a bearing made in the Example of the Invention.

Subsequently, the aforesaid preform 41 was preheated to 700° C. and placed in a mold. Thereafter, an aluminum alloy (ADC12) was melted at 700° C. and the molten aluminum alloy was cast into preform 41 to make a bearing cap 11 as illustrated in FIG. 11. The dimensions of this bearing cap 11 were such that its height at both lateral ends was 45 mm, the thickness of composite material 35 at both lateral ends was 40 mm, its thickness at the middle point was 20 mm, the thickness of composite material 35 at the middle point was 15 mm, and the diameter of the bearing bore was 50 mm. A comparison of FIGS. 3 and 11 reveals that A=45 mm and B=20 mm. Since a=40 mm and b=15 mm, the thickness of aluminum alloy layer 33 was 5 mm throughout bearing cap 11 including both bearing ends and the middle point, indicating that this satisfied the conditions defined by $A/2 \leq a < A$ and $B/2 \leq b < B$. In this bearing cap 11, composite material 35 had a coefficient of linear expansion of $18 \times 10^{-6}$/K and the aluminum alloy layer had a coefficient of linear expansion of $22 \times 10^{-6}$/K.

Comparative Examples 1 and 2

In contrast to the above-described Example of the Invention, a bearing cap (prior art) formed entirely of an aluminum alloy without using a preform 41 was made in Comparative Example 1. That is, the bearing cap was made by pouring a molten aluminum alloy (ADC12) into a mold and diecasting it.

Moreover, a bearing cap formed entirely of a composite material without forming an aluminum alloy layer 33 was made in Comparative Example 2. This composite material 35 was formed of the same materials as used for the preparation of preform 41 in the above-described Example of the Invention. Specifically, SiC particles having a particle diameter of 5 $\mu$m and $Al_2O_3$ fibers having a cross-sectional diameter of 3 $\mu$m were blended at a ratio of 8:2. After 5 wt. % of silica ($SiO_2$) sol was added, the resulting blend was compression-molded to make a bearing cap.

Figure 12:
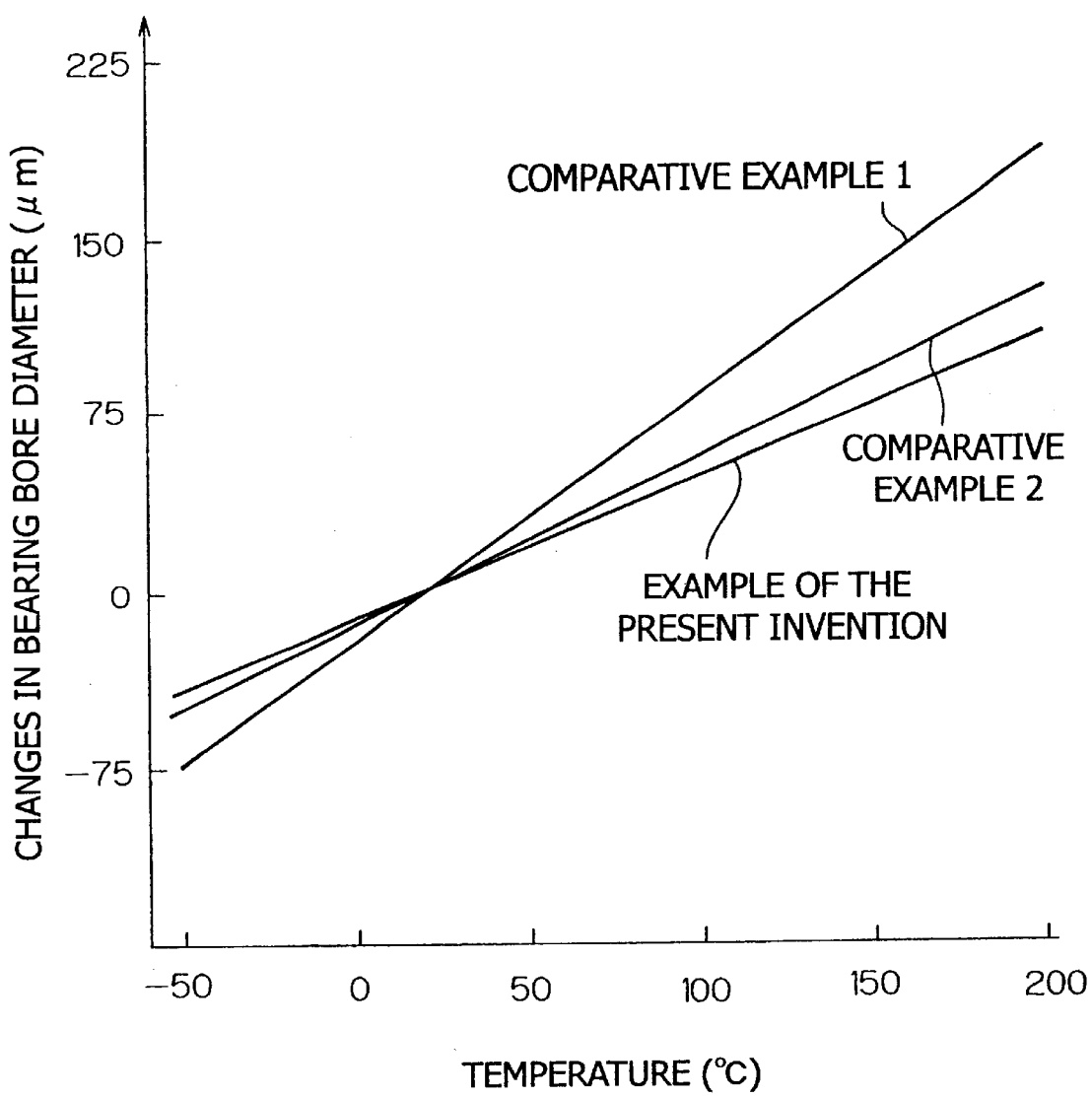
FIG. 12 is a graph showing changes in bearing bore diameter of the bearings made in the Example of the Invention and Comparative Examples 1 and 2.
Figure 13:
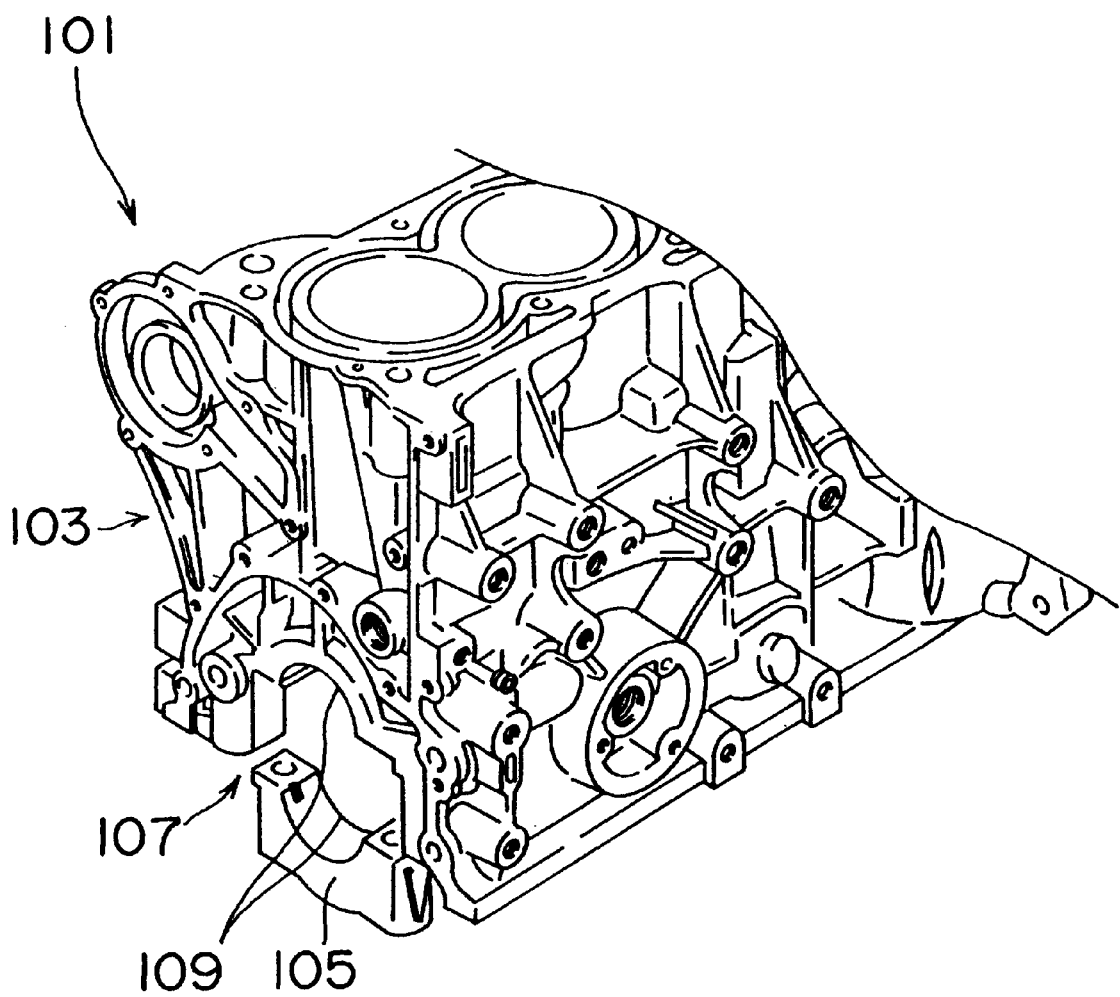
FIG. 13 is a perspective view of a conventional cylinder block.

Each of the bearing caps made in the forgoing Example of the Invention and Comparative Examples 1 and 2 was attached to a cylinder block (ADC12) at 25° C. Then, the engine was operated and changes in the bearing bore diameter of the cylinder block with temperature were measured over a temperature range of −50 to 200° C. The results thus obtained are shown in the graph of FIG. 12.

It can be seen from this graph that the bearing cap of the Example of the Invention shows the smallest changes in bearing bore diameter. In the vicinity of 20° C. (i.e., room temperature), there was little difference between the Example of the Invention and Comparative Examples. Thereafter, as the temperature becomes higher, the differences between changes in bearing bore diameter increased gradually. At high temperatures (e.g., at 200° C.), the difference between the Example of the Invention and Comparative Example 1 was about 80 $\mu$m, and the difference between the Example of the Invention and Comparative Example 2 was about 25 $\mu$m.

In the Example of the Invention, the addition of silica sol caused the angle of contact of the surfaces of SiC particles and $Al_2O_3$ fibers to decrease from 160° C. to 120° C., indicating an improvement in the wettability of SiC particles and $Al_2O_3$ fibers by a molten aluminum alloy. Consequently, the pressure at which a molten aluminum alloy began to penetrate into preform 41 was reduced to 0.19 MPa. However, in the absence of silica sol, the pressure at which a molten aluminum alloy began to penetrate into a preform was 0.19 MPa on the assumption that the blend of SiC particles and $Al_2O_3$ fibers had an average particle diameter of 4.6 $\mu$m. From these results, it has been found that the addition of silica sol greatly facilitates the penetration of a molten aluminum alloy into a preform.

What is claimed is:

1. A cylinder block comprising a main body of the cylinder block, a bearing attached to the underside of said main body, and a bearing section for rotatably supporting a crankshaft formed by the underside of said main body and said bearing, wherein said bearing section comprises a composite material having an aluminum alloy layer formed on an outer portion thereof to form a sliding portion of said bearing section on which a crankshaft rotates, and wherein the coefficient of thermal expansion of said composite material is lower than that of said aluminum alloy layer.

2. A cylinder block as claimed in claim 1 wherein said composite material is prepared by compression-molding one of a particulate material, a fibrous material, or a mixture of a particulate material and a fibrous material, and impregnating the resulting preform with a molten aluminum alloy.

3. A cylinder block as claimed in claim 2 wherein one of said particulate material or said fibrous material comprises a ceramic material.

* * * * *